Patented May 14, 1946

UNITED STATES PATENT OFFICE 2,400,433

ORGANIC ACIDS

Samuel Natelson, Benjamin Kramer, and Ralph Tekel, Brooklyn, N. Y., assignors to Jewish Hospital of Brooklyn Research Foundation, Brooklyn, N. Y.

No Drawing. Application February 18, 1946, Serial No. 648,568

4 Claims. (Cl. 260—521)

This invention relates to halogenated hydroxy phenyl derivatives of saturated carboxylic acids and the salts and esters thereof.

We have found that these compounds, because of their opacity to X-rays, are particularly valuable as contrast media in roentgenological examinations. Such media are used for visualization of the gall bladder, the genito-urinary system, the hepato-splenic system, the cerebrospinal system, and other cavities capable of retaining the media. They may be administered orally, intravenously or directly into the cavity to be outlined. These compounds are particularly valuable for the visualization of the gall bladder.

Of major importance in selecting a contrast medium for the visualization of the gall bladder are such factors as:

1. Velocity and certainty of concentration at the particular locality under investigation.
2. Ease of administration.
3. Certainty of unaided elimination after use, and toleration by the patient.

We have found that halogenated, particularly the iodinated, hydroxy phenyl derivatives of carboxylic acids, in which the carboxyl group is linked to a saturated hydrocarbon radical, and the salts of said esters are especially advantageous for use as contrast media because:

1. They are stable compounds of definite chemical composition, the halogen being firmly attached to the benzene ring.
2. They contain not more than one benzenoid structure with a free phenolic group.

The importance of maintaining the phenolic group in free condition is that it renders the compound susceptible of ready absorption and concentration in the gall bladder, as well as subsequent easy elimination from the body.

These compounds have the general formula $$HO(C_6I_xH_{(4-x)}).R.COOH$$

wherein:

$x$ is selected from the integers in the series 1 and 2.

R is a saturated hydrocarbon radical having 3 to 17 carbon atoms.

For the visualization of the gall bladder they may be used in the free acid form or in the form of their soluble salts prepared from organic or inorganic bases.

The known agents for visualizing the gall bladder produce objectionable physiological reactions. The three contrast media which have been used for visualizing the gall bladder are (1) tetra iodo phenol phthalein having the structural formula

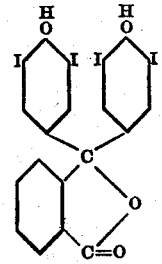

(2) diiodo hydroxy atophan having the formula

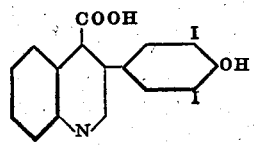

and (3) beta-4-hydroxy-3,5-diiodo phenylalpha phenyl propionic acid having the formula

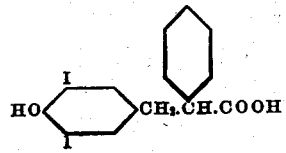

Tetra iodo phenyl phthalein produces excessive vomiting and nausea. Diiodo hydroxy atophan has been found so toxic that it was withdrawn from the market. Beta - 4 - hydroxy-3,5-diiodo phenyl alpha phenyl propionic acid produces pain on urination, interferes with the rate of contraction of the gall bladder, and has been shown to be highly toxic when administered intravenously. 150–200 milligrams per kilogram is a lethal dose for cats.

On examining the molecular structures of the foregoing compounds, it occurred to us that the essential groups within these molecules which produced gall bladder visualization was the hydroxy diiodo phenyl structure and the carboxy group, the former functioning as the vehicle for delivery of the compound to the gall bladder and the latter in the form of the sodium salt furnishing the product with the power of miscibility in the bile which is itself a mixture of alkaline salts.

The carboxy group could not be the source of toxicity for it is found in the body. The diiodo hydroxy phenyl group itself could not be the source of toxicity for it is known that iodination of a compound markedly decreases the physiological reaction of the compound. For example, phenol phthalein is administered in amounts of the order of a grain to induce peristalsis of the large bowel. Tetra iodo phenol phthalein (administered in the form of the sodium salt) does not produce such effects even when administered in doses of six grams, the dosage customarily used when this compound is employed for visualizing the gall bladder. The administration of six grams of phenol phthalein would be disastrous.

It occurred to us, therefore, that the center of toxicity of the known gall bladder contrast agents must reside in other parts of the molecule. For example, in the case of the iodinated hydroxy atophan, toxicity must have resided in the quinoline structure which is known to be highly active physiologically. In the case of the phenol phthalein structure and in the beta-4-hydroxy 3,5 diiodo phenyl alpha phenyl propionic acid toxicity must have resided in the benzene nucleus. We felt that elimination of a free benzenoid structure, that is, one which was uniodinated, should produce compounds which would be well tolerated by the body.

Compounds such as 4 hydroxy diiodo benzoic acid and 4 hydroxy diiodo phenyl propionic acid had been reported. Neither of these compounds contains a free benzenoid structure. On testing these products it was found that they were unsuitable for use in visualizing the gall bladder because they were rapidly eliminated by the kidney. We decided that these molecules lacked the fatty characteristic which was a prerequisite for the concentration of a molecule in the gall bladder. We first prepared the gamma-(4 hydroxy-3,5-diiodo phenyl) butyric acid and found that it possessed, as contrasted with its lower adjacent homologue, a marked difference in its ability to concentrate in the gall bladder. Visualization of the gall bladder could be observed on oral administration of doses of three grams. However, the visualization lacked sufficient intensity to be consistently reliable for diagnostic purposes.

We studied, therefore, the effect of lengthening the chain and prepared the following compounds:

Delta 4 hydroxy-3,5-diiodo phenyl valeric acid.
Epsilon 4 hydroxy-3,5-diiodo phenyl caproic acid.
Zeta 4 hydroxy-3,5-diiodo phenyl oenanthic acid.
Eta 4 hydroxy-3,5-diiodo phenyl caprylic acid.
Theta 4 hydroxy-3,5-diiodo phenyl pelargonic acid.
Iota 4 hydroxy-3,5-diiodo phenyl capric acid.
Kappa 4 hydroxy-3,5-diiodo phenyl undecanoic acid.
Lambda 4 hydroxy-3,5-diiodo phenyl dodecanoic acid.

We observed that these compounds were good agents for visualization of the gall bladder, the best in the series being the valeric, caproic, heptanoic, and the octanoic acid derivatives. As the chain became longer the rate of absorption decreased and some unabsorbed portions of the longer chain compounds could be seen in the intestinal tract on X-raying the subject.

This study confirmed our concept that the hydroxy diiodo phenyl group and the carboxy group were essential structures in a compound used for visualization of the gall bladder. It also confirmed what we had felt, namely, that a portion of the molecule had to impart oil solubility so that the compound resembled bile salts. If this were true, then branching of the chain or shifting the position of the hydroxy diiodo phenyl group on the chain should not materially alter the gall bladder visualizing properties of such isomeric and related compounds. We then prepared the following compounds:

Alpha-(4 hydroxy-3,5-diiodo benzyl) propionic acid.
Alpha-(4 hydroxy-3,5-diiodo benzyl) butyric acid.
Alpha-(4 hydroxy-3,5-diiodo benzyl) valeric acid.
Alpha-(4 hydroxy-3,5-diiodo benzyl) caproic acid.
Alpha-(4 hydroxy-3,5-diiodo benzyl) oenanthic acid.
Alpha-(4 hydroxy-3,5-diiodo benzyl) caprylic acid.
Alpha-(4 hydroxy-3,5-diiodo benzyl) pelargonic acid.
Alpha-(4 hydroxy-3,5-diiodo benzyl) capric acid.
Alpha-(4 hydroxy-3,5-diiodo benzyl) undecanoic acid.
Alpha-(4 hydroxy-3,5-diiodo benzyl) lauric acid.
Alpha-(4 hydroxy-3,5-diiodo benzyl) tridecanoic acid.
Alpha-(4 hydroxy-3,5-diiodo benzyl) myristic acid.
Alpha-(4 hydroxy-3,5-diiodo benzyl) pentadecanoic acid.
Alpha-(4 hydroxy-3,5-diiodo benzyl) palmitic acid.
Alpha-(4 hydroxy-3,5-diiodo benzyl) margaric acid.
Alpha-(4 hydroxy-3,5-diiodo benzyl) stearic acid.

This series was extended beyond that used in the study of the straight chain compounds because of the relative ease of preparing these branched chain compounds by condensing 4 methoxy benzaldehyde with readily available straight chain fatty acids. The compounds of this series were found to produce good visualization of the gall bladder. The best members of the series were Alpha-(4 hydroxy-3,5-diiodo benzyl) butyric acid.
Alpha-(4 hydroxy-3,5-diiodo benzyl) valeric acid.
Alpha-(4 hydroxy-3,5-diiodo benzyl) caproic acid.
Alpha-(4 hydroxy-3,5-diiodo benzyl) oenanthic acid.

Starting with the alpha-4 hydroxy-3,5-diiodo benzyl decanoic acid, lack of complete absorption from the intestinal tract necessitated taking the X-ray photograph from certain angles so that the gall bladder would be shown on the plate separated from the large bowel.

This finding closely paralleled the observations on the straight chain compounds, even though the position of the hydroxy diiodo phenyl group had been changed and the chain had been branched.

The conclusion drawn from the study of these groups of compounds was that the value of the compounds as agents for visualization of the gall bladder resided in the fact that their molecular structures consisted of a divalent saturated hydrocarbon radical linked to a hydroxy diiodo phenyl group and a carboxyl group, the hydrocarbon radical having a sufficient number of carbon atoms to impart requisite oil solubility to the molecule.

In order to ascertain whether similar compounds of comparable molecular size and having but one hydroxy diiodo phenyl group in the molecule would also be good contrast agents for the gall bladder, we then prepared the following compounds:

Kappa-(4 hydroxy-3,5-diiodo phenyl) stearic acid having the formula

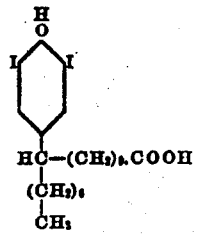

1-(acetic acid)-2(4 - OH - 3,5 - diiodo phenyl)-cyclohexane having the formula

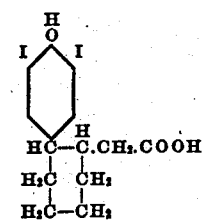

(4-OH-3,5-diiodo phenyl) dihydro hydnocarpic acid having the formula

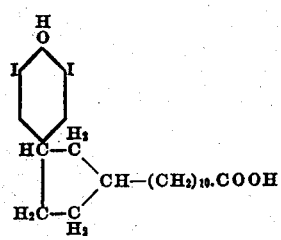

(4-OH-3,5-diiodo phenyl) dihydro chaulmoogric acid having the formula

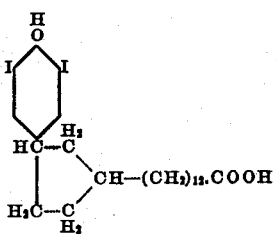

1(acetic acid)2-(4-OH-3,5-diiodo phenyl) cyclohexane is an excellent gall bladder contrast agent. It has a saturated hydrocarbon nucleus of seven carbon atoms to which the diiodo hydroxy phenyl group and the carboxyl group are attached.

Although kappa-(4-hydroxy-3,5-diiodo phenyl) stearic acid, (4-OH-3,5-diiodo phenyl)-dihydro hydnocarpic acid, and (4-OH-3,5-diiodo phenyl)-dihydro chaulmoogric acid were found to concentrate well in the gall bladder, they exhibited a failure to become completely absorbed from the intestinal tract. In this manner their activity was similar to that of the other compounds having more than 10 carbon atoms in the saturated hydrocarbon radical, to which the benzenoid group and the carboxyl group were attached.

In addition to the compounds above described we also prepared the following compounds:

Alpha methyl, gamma gamma gamma di-methyl-(4 hydroxy-3,5-diiodo phenyl) butyric acid, having the formula

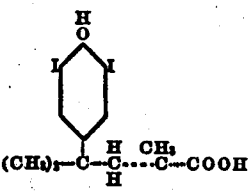

2-(4-OH-3,5-diiodo phenyl)-cyclohexyl carboxylic acid having the formula

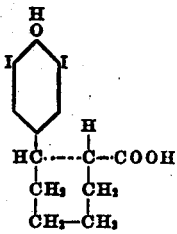

We also prepared the following compounds:

2-(4 hydroxy-3,5-diiodo benzyl) cyclohexyl carboxylic acid, having the formula

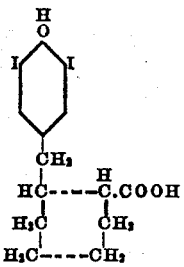

2-(4 hydroxy-3,5-diiodo benzyl)-3,5-dimethyl cyclohexyl carboxylic acid, having the formula

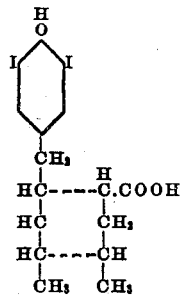

Zeta-(4 hydroxy - 3,5 - diiodo phenyl) zeta methyl, alpha methyl caprylic acid, having the formula

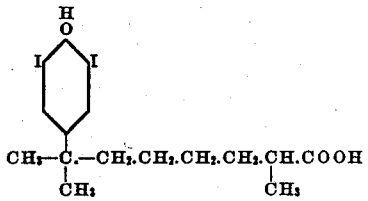

Delta-(4 hydroxy-3,5-diiodo phenyl) caproic acid, having the formula

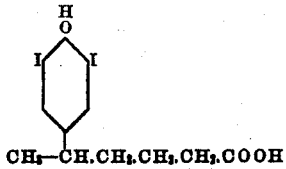

Alpha methyl-2-(4 hydroxy-3,5-diiodo phenyl)-4 methyl cyclohexyl acetic acid, having the formula

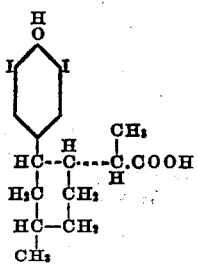

Alpha ethyl-2-(4 hydroxy-3,5-diiodo phenyl)-cyclohexyl acetic acid, having the formula

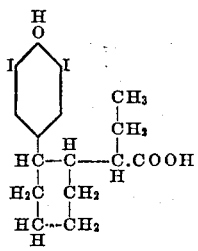

2-(4 hydroxy-3,5-diiodo phenyl)-cyclo pentyl acetic acid, having the formula

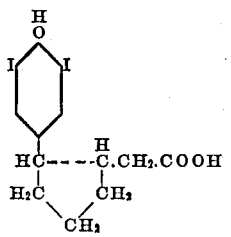

Alpha-(4 hydroxy-3,5-diiodo benzyl)-isovaleric acid, having the formula

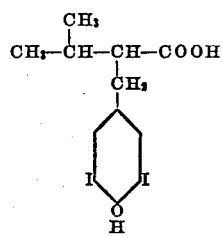

Alpha-(4 hydroxy-3,5-diiodo benzyl)-isocaproic acid, having the formula

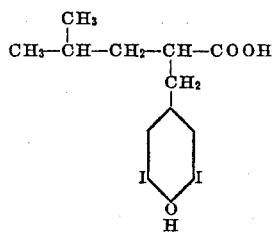

Alpha (4 hydroxy-3,5-diiodo benzyl) cyclo pentyl acetic acid having the formula

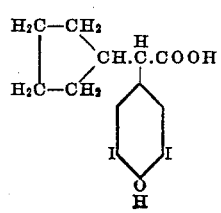

Alpha (4 hydroxy-3,5-diiodo benzyl) cyclo hexyl acetic acid having the formula

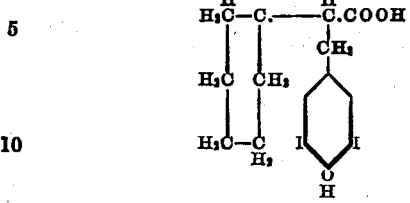

These compounds were satisfactory gall bladder contrast agents.

It is apparent that the branching of the chain or the changing of position of the hydroxy diiodo phenyl group does not alter the value of the compound as a gall bladder contrast agent. The efficacy of these compounds in visualizing the gall bladder resides in the fact that they all contain a hydroxy diiodo phenyl group and carboxyl group linked to a saturated hydrocarbon radical of from 4 to 10 carbon atoms which renders them oil soluble but does not interfere with the absorption of the compounds from the intestinal tract.

The particular advantage of our compounds in visualizing the gall bladder resides in the fact that the saturated carboxylic acids contain no free benzenoid structure nor any other center of toxicity. They are compounds derived by the substitution of a 4 hydroxy 3,5 diiodo phenyl group for one of the hydrogen atoms of saturated fatty acids.

From the above considerations it is apparent that of the 4-hydroxy-3,5-diiodo phenyl saturated aliphatic acids described herein, those having a divalent saturated aliphatic hydrocarbon radical of from 4 to 10 carbon atoms are especially valuable for cholecystography.

EXAMPLE 1

KAPPA-(4 HYDROXY-3,5-DIIODO PHENYL)-UNDECANOIC ACID

This acid corresponds to the formula

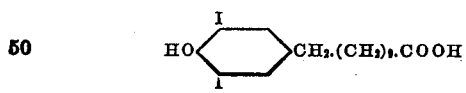

1.926 moles of anisole, dissolved in 200 cc. of aluminum chloride-dried petroleum ether, are added to 1.926 moles of anhydrous aluminum chloride, at a temperature maintained by an ice and salt bath, of 0°–5° C. Then 0.963 mole of methyl undecylenate is slowly added through a dropping funnel, keeping the reaction temperature below 20° C. The mixture is then stirred for 30 minutes, brought to room temperature and the stirring continued until the petroleum ether layer no longer absorbs any bromine, indicating that the —C:C— linkage has been completely saturated.

The addition product thus formed is decomposed by pouring it into 250 grams of ice mixed with 100 cc. of concentrated hydrochloric acid. Then the aqueous layer is separated from the oily layer which is washed with water until it is free of acid, and dried overnight with anhydrous sodium sulphate. The sodium sulphate is removed by filtration and the petroleum ether removed from the filtrate by heating on a steam bath.

The unreacted anisole is removed by vacuum or steam distillation, and the ester condensation product, methyl (methoxy-phenyl) undecanoate, distilled at a pressure of 0.05–0.4 mm. It is a pale yellow oil.

Demethylation

*Saponification of the ester.*—Into a solution of 0.55 mole of potassium hydroxide in 500 cc. of ethyl alcohol there is added 0.5 mole of the ester, and the mixture refluxed for one hour. Then the alcohol is removed by distillation, under vacuum, on a hot water bath. To the residue, 2 liters of water are added, keeping the temperature low, and after saturation with sodium sulphate, hydrochloric acid is slowly added until acidification is completed. The aqueous layer is removed from the oily acid, twice extracted with 150 cc. portions of ethyl ether, and the extracts combined with the oily acid. The combined acids are washed with water several times, and dried overnight with anhydrous sodium sulphate which is subsequently removed by filtration. The ether is removed by evaporation from the filtrate on a steam bath, and the residual acid, methoxy-phenyl undecanoic acid, distilled at a pressure of 0.05–0.4 mm. It is a slightly viscous yellow oil.

*Final demethylation.*—1.5 moles of the acid are added to 5 moles of 48% hydrobromic acid dissolved in 2 liters of glacial acetic acid, and the mixture is refluxed while a stream of nitrogen or carbon dioxide flows continuously over the surface of the reaction mixture until demethylation is completed (about 20 hours). The mixture is added to water, acidified and filtered. The residue is dissolved in ethyl ether, washed with water and dried over sodium sulphate. Then the ether is evaporated off, and the acid, hydroxy-phenyl undecanoic acid, is distilled at a pressure of 0.05–0.4 mm. It is a viscous straw-colored oil.

Alternative method of demethylation 1.113 moles of methyl (methoxyphenyl) undecanoate are dissolved in a solution of 6 moles of potassium hydroxide in 800 cc. of diethylene glycol, and heated at 200°–225° C. for 8–12 hours with air reflux while a stream of nitrogen is passed over the surface of the reaction mixture. The reaction mixture is then poured into 3 liters of water and acidified with hydrochloric acid (concentrated). The water layer is separated and extracted with two 150 cc. portions of ethyl ether. The ether extracts are combined with the oily layer and washed several times with water and then dried over anhydrous sodium sulphate. After filtration to remove the sodium sulphate, the ether is evaporated. The demethylated product (hydroxy phenyl undecanoic acid) is vacuum distilled at 0.05–0.4 mm.

Iodination 1 mole of hydroxy-phenyl undecanoic acid is dissolved in 10% sodium hydroxide solution containing 5 moles sodium hydroxide. To the solution, cooled to 0.0°–5° C. with an ice-salt bath, there is slowly added 5 moles of iodine contained in a 50% solution of potassium iodide. The mixture is stirred for 2–3 hours, and the excess iodine is destroyed with a saturated solution of sodium bisulphite. Then the mixture is acidified with concentrated hydrochloric acid. The acidified material is extracted with 500 cc. of ethyl ether and the extract, after washing with water, is dried with anhydrous sodium sulphate which is subsequently removed by filtration. The ether is evaporated from the filtrate, leaving the kappa-(4-hydroxy-3,5-diiodo phenyl) undecanoic acid, which may be used as a contrast medium for visualization of the gall bladder.

EXAMPLE 2

IOTA-(4 HYDROXY-3,5-DIIODO PHENYL)-DECANOIC ACID

This acid corresponds to the formula

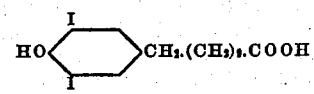

1 mole of sebacic acid is refluxed for five hours with redistilled acetic anhydride. The excess acetic anhydride as well as any acetic acid formed are removed by distillation under reduced pressure on a boiling water bath. The sebacic anhydride is dissolved by warming in 400 cc. of acetylene tetrachloride (re-distilled and dried). To this solution there are added 1.2 moles of anisole, and the resulting solution cooled by means of an ice-salt bath to 0° C. There are then added 2.2 moles of anhydrous aluminum chloride over a period of one hour, care being taken to keep the temperature from exceeding 40° C. The resultant mass is then heated on a steam bath for one-half hour during which time hydrogen chloride fumes are evolved. Then the condensation product is cooled with a water bath. To this mass there are added 2 liters of a cold 10% hydrochloric acid solution. The water layer is removed after which the anisole and acetylene tetrachloride are removed by steam distillation.

The anisoyl keto-nonane acid precipitates as an oil which crystallizes. It is separated from the aqueous layer, washed with hot water, and the residue digested with 150 grams of sodium carbonate dissolved in 1 liter of water. After filtering, the filtrate is cooled and acidified with 250 cc. of concentrated hydrochloric acid. The acid crystallizes. The crystals are removed by filtration and dried. The acid can be recrystallized from benzene or other suitable solvents.

Reduction of keto acid

Shake 100 grams of mossy zinc, 10 grams mercuric chloride, 5 cc. concentrated hydrochloric acid and 150 cc. water. Decant the supernatant fluid and to the residue add 75 cc. of water, 175 cc. of concentrated hydrochloric acid, 100 cc. of ethyl alcohol and 100 cc. of toluene. To the foregoing mixture there are added 0.085 mole of the keto acid. It is then refluxed for 24 hours during which time three 50 cc. portions of concentrated hydrochloric acid are added every six hours. The material is then cooled to room temperature, the toluene layer separated, and the water layer extracted with ether. The extract and the toluene layer are combined and dried over calcium chloride, after which the solvents are removed by distillation. The residual material may recrystallized from appropriate solvents or purified by vacuum distillation at a pressure of not more than 1 mm.

Demethylation and iodination of the hydroxy-phenyl fatty acid is carried out in accordance with the procedure generally described in Example 1, yielding iota-(4 hydroxy-3,5-diiodo phenyl)-decanoic acid.

EXAMPLE 3

ALPHA-(4 HYDROXY-3,5-DIIODO BENZYL)-PELARGONIC ACID

This acid corresponds to the formula

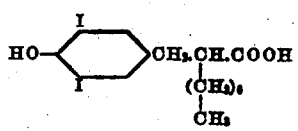

1 mole of sodium pelargonate, 3 moles of pelargonic anhydride and 1 mole of p-methoxy benzaldehyde are heated at 100° C. for 4 hours. The reaction mixture is poured into water and neutralized, while hot, with alkali, and subsequently acidified with hydrochloric acid. The acidulated mixture is extracted with ethyl ether. The extract is dried with anhydrous sodium sulphate, and the acid condensation product recovered by vacuum distillation. It is then reduced catalytically at 100° C. with hydrogen under pressure. (With a Raney nickel catalyst at 500 lbs.; with $PtO_2$ at 50 lbs.)

The reactions are as follows:

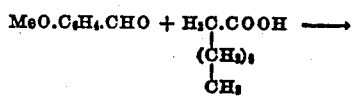

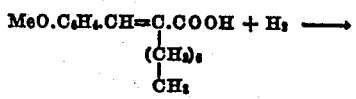

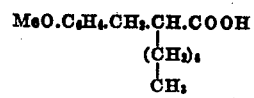

The methoxy phenyl acid is then demethylated and iodinated as described in Example 1, yielding alpha-(4 hydroxy-3,5-diiodo benzyl) pelargonic acid.

EXAMPLE 4

ALPHA-(4 HYDROXY-3,5-DIIODO BENZYL) PROPIONIC ACID

This acid corresponds to the formula

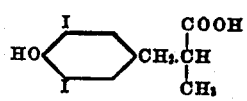

from which it will be seen that it differs from the compound of Example 3 in that the hydroxy diiodo benzyl group occupies the alpha position of propionic acid, a position similar to that which it occupies in the corresponding pelargonic acid derivative of Example 3.

1 mole of sodium propionate, 3 moles of propionic anhydride, and 1 mole of p-methoxy benzaldehyde are heated at 100° C. for 4 hours. The reaction mixture is worked up as in Example 3. The distillate is reduced with hydrogen as in Example 3, and demethylated and iodinated as described in Example 1.

After iodination is completed, the alkaline solution is added to excess concentrated hydrochloric acid with vigorous stirring. The precipitated acid is filtered off. It can be crystallized from chloroform.

EXAMPLE 5

ALPHA-(4 HYDROXY-3,5-DIIODO BENZYL)-BUTYRIC ACID

This acid corresponds to the formula

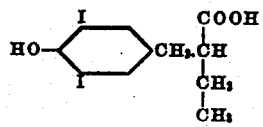

from which it will be seen that it differs from the compound of Example 3 in that the hydroxy diiodo benzyl group occupies the alpha position of butyric acid, a position similar to that which it occupies in the corresponding pelargonic acid derivative of Example 3.

1 mole of sodium butyrate, 3 moles of butyric anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 6

ALPHA-(4 HYDROXY-3,5-DIIODO BENZYL)-VALERIC ACID

This acid has the formula

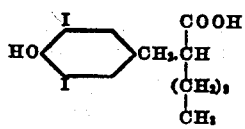

from which it will be seen that it differs from the compound of Example 3 in that the hydroxy diiodo benzyl group occupies the alpha position of valeric acid, a position similar to that which it occupies in the corresponding pelargonic acid derivative of Example 3

1 mole of sodium valerate, 3 moles of valeric anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 7

ALPHA-(4 HYDROXY-3,5-DIIODO BENZYL)-CAPROIC ACID

This acid has the formula

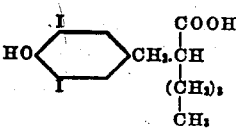

from which it will be seen that it differs from the compound of Example 3 in that the hydroxy diiodo benzyl group occupies the alpha position of caproic acid, a position similar to that which it occupies in the corresponding pelargonic acid derivative of Example 3.

1 mole of sodium caproate, 3 moles of caproic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 8

ALPHA-(4 HYDROXY-3,5-DIIODO BENZYL)- HEPTANOIC ACID

This acid has the formula

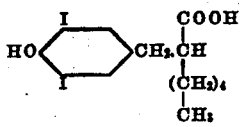

from which it will be seen that it differs from the compound of Example 3 in that the hydroxy diiodo benzyl group occupies the alpha position of heptanoic acid, a position similar to that which it occupies in the corresponding pelargonic acid derivative of Example 3.

1 mole of sodium heptanoate, 3 moles of heptanoic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 9

ALPHA-(4 HYDROXY-3,5-DIIODO BENZYL)- OCTANOIC ACID

This acid has the formula

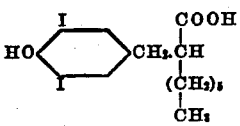

from which it will be seen that it differs from the compound of Example 3 in that the hydroxy diiodo benzyl group occupies the alpha position of octanoic acid, a position similar to that which it occupies in the corresponding pelargonic acid derivative of Example 3.

1 mole of sodium octanoate, 3 moles of octanoic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 10

ALPHA-(4 HYDROXY-3,5-DIIODO BENZYL)- DECANOIC ACID

This acid has the formula

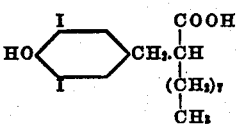

from which it will be seen that it differs from the compound of Example 3 in that the hydroxy diiodo benzyl group occupies the alpha position of decanoic acid, a position similar to that which it occupies in the corresponding pelargonic acid derivative of Example 3.

1 mole of sodium decanoate, 3 moles of decanoic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 11

ALPHA-(4 HYDROXY-3,5-DIIODO BENZYL)- UNDECANOIC ACID

This acid has the formula

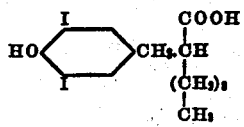

from which it will be seen that it differs from the compound of Example 3 in that the hydroxy diiodo benzyl group occupies the alpha position of undecanoic acid, a position similar to that which it occupies in the corresponding pelargonic acid derivative of Example 3.

1 mole of sodium undecanoate, 3 moles of undecanoic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 12

ALPHA-(4 HYDROXY-3,5-DIIODO BENZYL)- LAURIC ACID

This acid has the formula

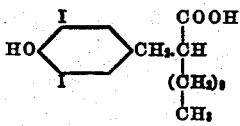

from which it will be seen that it differs from the compound of Example 3 in that the hydroxy diiodo benzyl group occupies the alpha position of lauric acid, a position similar to that which it occupies in the corresponding pelargonic acid derivative of Example 3.

1 mole of sodium laurate, 3 moles of lauric anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 13

ALPHA-(4 HYDROXY-3,5-DIIODO BENZYL)- TRIDECANOIC ACID

This acid has the formula

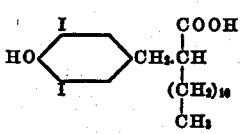

from which it will be seen that it differs from the compound of Example 3 in that the hydroxy diiodo benzyl group occupies the alpha position of tridecanoic acid, a position similar to that which it occupies in the corresponding pelargonic acid derivative of Example 3.

1 mole of sodium tridecanoate, 3 moles of tridecanoic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 14

ALPHA-(4 HYDROXY-3,5-DIIODO BENZYL)-
MYRISTIC ACID

This acid has the formula

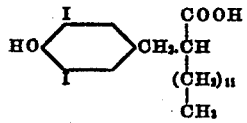

from which it will be seen that it differs from the compound of Example 3 in that the hydroxy diiodo benzyl group occupies the alpha position of myristic acid, a position similar to that which it occupies in the corresponding pelargonic acid derivative of Example 3.

1 mole of sodium myristate, 3 moles of myristic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 15

ALPHA-(4 HYDROXY-3,5-DIIODO BENZYL)-
PENTADECANOIC ACID

This acid has the formula

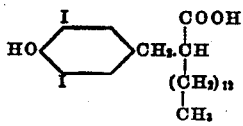

from which it will be seen that it differs from the compound of Example 3 in that the hydroxy diiodo benzyl group occupies the alpha position of pentadecanoic acid, a position similar to that which it occupies in the corresponding pelargonic acid derivative of Example 3.

1 mole of sodium pentadecanoate, 3 moles of pentadecanoic anhydride, and 1 mole of p-methoxy benzaldehyde are condensed as in Example 3. The purified product of this condensation is hydrogenated as in Example 3, followed as in Example 1 by demethylation and iodination as in Example 4.

EXAMPLE 16

ALPHA-(4 HYDROXY-3,5-DIIODO BENZYL)-
PALMITIC ACID

This acid has the formula

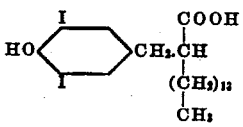

from which it will be seen that it differs from the compound of Example 3 in that the hydroxy diiodo benzyl group occupies the alpha position of palmitic acid, a position similar to that which it occupies in the corresponding pelargonic acid derivative of Example 3.

1 mole of sodium palmitate, 3 moles of palmitic anhydride, and 1 mole of p-methoxy benzaldehyde are condensed as in Example 3. The purified product of this condensation is hydrogenated as in Example 3, followed by demethylation as in Example 1 and iodination as in Example 4.

EXAMPLE 17

ALPHA-(4 HYDROXY-3,5-DIIODO BENZYL)-
MARGARIC ACID

This acid has the formula

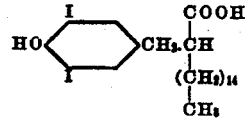

from which it will be seen that it differs from the compound of Example 3 in that the hydroxy diiodo benzyl group occupies the alpha position of margaric acid, a position similar to that which it occupies in the corresponding pelargonic acid derivative of Example 3.

1 mole of sodium margarate, 3 moles of margaric anhydride, and 1 mole of p-methoxy benzaldehyde are condensed as in Example 3. The purified product of this condensation is hydrogenized as in Example 3, followed by demethylation as in Example 1 and iodination as in Example 4.

EXAMPLE 18

ALPHA-(4 HYDROXY-3,5-DIIODO BENZYL)-
STEARIC ACID

This acid has the formula

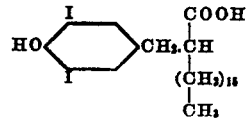

from which it will be seen that it differs from the compound of Example 3 in that the hydroxy diiodo benzyl group occupies the alpha position of stearic acid, a position similar to that which it occupies in the corresponding pelargonic acid derivative of Example 3.

1 mole of sodium stearate, 3 moles of stearic anhydride, and 1 mole of p-methoxy benzaldehyde are condensed as in Example 3. The purified product of this condensation is hydrogenized as in Example 3, followed by demethylation as in Example 1 and iodination as in Example 4.

EXAMPLE 19

GAMMA-(4 HYDROXY-3,5-DIIODO PHENYL)-
BUTYRIC ACID

This acid has the formula

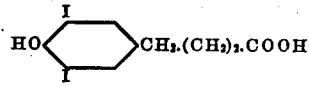

This compound corresponds to the compound of Example 2 in that the 4-hydroxy diiodo benzyl group is attached to the end carbon atom of butyric acid, a position similar to that which it occupies in the decanoic acid derivative of Example 2.

1 mole of succinic acid is converted to its anhydride as described in Example 2. The succinic anhydride is condensed with anisole with the aid of aluminum chloride as described in Example 2. The keto acid obtained is reduced with zinc dust and hydrochloride acid as described in Example 2. The methoxy phenyl butyric acid thus obtained is demethylated as in Example 1 and iodinated as described in Example 4.

EXAMPLE 20

DELTA-(4 HYDROXY-3,5-DIIODO PHENYL)-VALERIC ACID

This acid has the formula

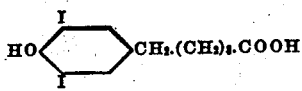

This compound corresponds to the compound of Example 2 in that the 4-hydroxy diiodo phenyl group is attached to the end carbon atom of valeric acid, a position similar to that which it occupies in the decanoic acid derivative of Example 2.

1 mole of glutaric acid is converted to its anhydride as described in Example 2. The glutaric anhydride is condensed with anisole with the aid of aluminum chloride as described in Example 2. The keto acid obtained is reduced with zinc dust and hydrochloride acid as described in Example 2. The methoxy phenyl valeric acid thus obtained is demethylated as in Example 1 and iodinated as described in Example 4.

EXAMPLE 21

EPSILON-(4 HYDROXY-3,5-DIIODO PHENYL)-CAPROIC ACID

This acid has the formula

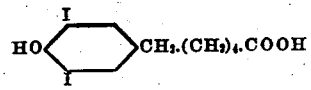

This compound corresponds to the compound of Example 2 in that the 4-hydroxy diiodo phenyl group is attached to the end carbon atom of caproic acid, a position similar to that which it occupies in the decanoic acid derivative of Example 2.

1 mole of adipic acid is converted to its anhydride as described in Example 2. The adipic anhydride is condensed with anisole with the aid of aluminum chloride as described in Example 2. The keto acid obtained is reduced with zinc dust and hydrochloric acid as describe in Example 2. The methoxy phenyl caproic acid thus obtained is demethylated as in Example 1 and iodinated as described in Example 4.

EXAMPLE 22

ZETA-(4 HYDROXY-3,5-DIIODO PHENYL)-HEPTANOIC ACID

This acid has the formula

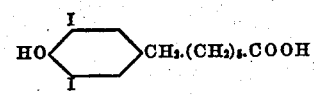

This compound corresponds to the compound of Example 2 in that the 4-hydroxy diiodo phenyl group is attached to the end carbon atom of heptanoic acid, a position similar to that which it occupies in the decanoic acid derivative of Example 2.

1 mole of pimelic acid is converted to its anhydride as described in Example 2. The pimelic anhydride is condensed with anisole with the aid of aluminum chloride as described in Example 2. The keto acid obtained is reduced with zinc dust and hydrochloric acid as described in Example 2. The methoxy phenyl heptanoic acid thus obtained is demethylated as in Example 1 and iodinated as described in Example 4.

EXAMPLE 23

ETA-(4 HYDROXY-3,5-DIIODO PHENYL)-OCTANOIC ACID

This acid has the formula

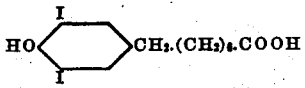

This compound corresponds to the compound of Example 2 in that the 4-hydroxy diiodo phenyl group is attached to the end carbon atom of octanoic acid, a position similar to that which it occupies in the decanoic acid derivative of Example 2.

1 mole of suberic acid is converted to its anhydride as described in Example 2. The suberic anhydride is condensed with anisole with the aid of aluminum chloride as described in Example 2. The keto acid obtained is reduced with zinc dust and hydrochloride acid as described in Example 2. The methoxy phenyl octanoic acid thus obtained is demethylated as in Example 1 and iodinated as described in Example 4.

EXAMPLE 24

THETA-(4 HYDROXY-3,5-DIIODO PHENYL)-PELARGONIC ACID

This acid has the formula

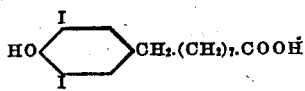

This compound corresponds to the compound of Example 2 in that the 4-hydroxy diiodo phenyl group is attached to the end carbon atom of pelargonic acid, a position similar to that which it occupies in the decanoic acid derivative of Example 2.

1 mole of azelaic acid is converted to its anhydride as described in Example 2. The azelaic anhydride is condensed with anisole with the aid of aluminum chloride as described in Example 2. The keto acid obtained is reduced with zinc dust and hydrochloride acid as described in Example 2. The methoxy phenyl pelargonic acid thus obtained is demethylated and iodinated as described in Example 1.

EXAMPLE 25

KAPPA-(4 HYDROXY-3,5-DIIODO PHENYL)-UNDECANOIC ACID

This acid has the formula

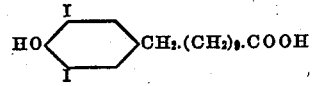

This compound corresponds to the compound of Example 2 in that the 4-hydroxy diiodo phenyl group is attached to the end carbon atom of undecanoic acid, a position similar to that which it occupies in the decanoic acid derivative of Example 2.

1 mole of undecandioic acid is converted to its anhydride as described in Example 2. The undecandioic anhydride is condensed with anisole with the aid of aluminum chloride as described in Example 2. The keto acid obtained is reduced with zinc dust and hydrochloride acid as described in Example 2. The methoxy phenyl undecanoic acid thus obtained is demethylated and iodinated as described in Example 1.

EXAMPLE 26

LAMBA-(4 HYDROXY-3,5-DIIODO PHENYL)-DODECANOIC ACID

This acid has the formula

This compound corresponds to the compound of Example 2 in that the 4-hydroxy diiodo phenyl group is attached to the end carbon atom of dodecanoic acid, a position similar to that which it occupies in the decanoic acid derivative of Example 2.

1 mole of dodecandioic acid is converted to its anhydride as described in Example 2. The dodecandioic anhydride is condensed with anisole with the aid of aluminum chloride as described in Example 2. The keto acid obtained is reduced with zinc dust and hydrochloride acid as described in Example 2. The methoxy phenyl dodecanoic acid thus obtained is demethylated and iodinated as described in Example 1.

EXAMPLE 27

IOTA-(4 HYDROXY-3,5-DIIODO PHENYL)-STEARIC ACID

This acid has the formula

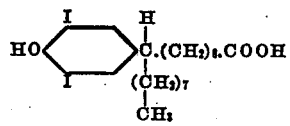

1.926 moles of anisole are dissolved in 0.963 mole of methyl oleate. The mixture is condensed by means of aluminum chloride as described in Example 1. The methyl (methoxy phenyl) stearic acid so obtained is saponified and demethylated as described in Example 1. The demethylated compound is then iodinated in accordance with the procedure of Example 1.

EXAMPLE 28

1-(ACETIC ACID)-2-(4 HYDROXY-3,5-DIIODO PHENYL)-CYCLOHEXANE

This acid has the formula

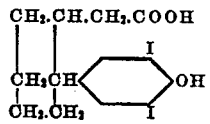

1.926 moles of anisole are dissolved in 0.963 mole of the methyl ester of cyclohexene acetic acid. The mixture is condensed by means of aluminum chloride as described in Example 1. The methoxy phenyl cyclohexane acetic acid methyl ester thus obtained is saponified and demethylated as described in Example 1. The product thus obtained, 1-(acetic acid)-2-(4 hydroxy phenyl) cyclohexane is iodinated as in Example 4.

EXAMPLE 29

XI-(4 HYDROXY-3,5-DIIODO PHENYL)-DIHYDRO-CHAULMOOGRIC ACID

This acid has the formula

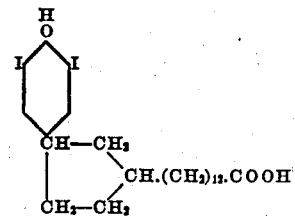

1.926 moles of anisole are dissolved in 0.963 mole of the methyl ester of chaulmoogric acid. The mixture is condensed by means of aluminum chloride as described in Example 1. The methoxy phenyl chaulmoogric acid methyl ester thus obtained is saponified and demethylated as described in Example 1. The product thus obtained, Xi-(4 hydroxy phenyl)-dihydrochaulmoogric acid is iodinated as in Example 1.

EXAMPLE 30

MU-(4 HYDROXY-3,5-DIIODO PHENYL)-DIHYDNO-CARPIC ACID

This acid has the formula

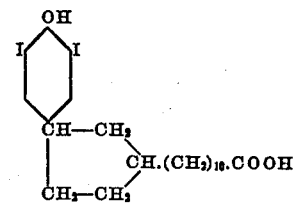

1.926 moles of anisole are dissolved in 0.963 mole of the methyl ester of hydnocarpic acid. The mixture is condensed by means of aluminum chloride as described in Example 1. The methoxy phenyl dihydrohydnocarpic acid methyl ester thus obtained is saponified and demethylated as described in Example 1. The product thus obtained, Mu-(4 hydroxy phenyl)-dihydrohydnocarpic acid is iodinated as described in Example 1.

EXAMPLE 31

Alpha-(4 hydroxy-3,5-diiodo benzyl) butyric acid, having the formula shown in Example 5, is prepared as follows:

122 grams (1 mole) of 4-hydroxy benzaldehyde is mixed with 632 grams (4 moles) of butyric anhydride and 126 grams (1 mole) of potassium butyrate. The butyric anhydride is prepared by refluxing 1 mole of butyric acid with 1.5 moles of acetic anhydride for 3 hours and slowly fractionating off the acetic acid and excess acetic anhydride.

The mixture of the butyric anhydride and the benzaldehyde containing the potassium butyrate is heated at 136° C. for 8 hours and then is poured into 1 gallon of hot water containing enough sodium hydroxide to neutralize the mixture and then an additional amount is added to bring the pH up to about 10.

This mixture is then heated on a steam bath for about 2 hours. All but a small amount of impurity dissolves. The insoluble oil impurity is separated and activated charcoal is added to the solution, which is then filtered. The filtrate is acidified with concentrated hydrochloric acid, and the alpha-(4 hydroxy benzal) butyric acid precipitates. The crystalline material is filtered off. The alpha-(4 hydroxy benzal) butyric acid is reduced to alpha-(4 hydroxy benzyl) butyric acid by redissolving the material in 10 per cent. sodium hydroxide and adding 3 per cent. of sodium amalgam (3 grams of amalgam to 1 gram of the product).

The mixture is heated to 70° C. and stirred vigorously for 4 to 8 hours. The mercury and unused mercury amalgam is separated and the solution is filtered after adding activated charcoal.

The filtered solution is acidified, resulting in the precipitation of the alpha-(4 hydroxy benzyl) butyric acid, which is filtered off and recrystallized from diluted alcohol. The iodination is carried out as in Example 4.

The following compounds were prepared in accordance with the method described in Example 31:

EXAMPLE 32

Alpha-(4 hydroxy - 3,5 - diiodo benzyl)-beta methyl butyric acid having the formula

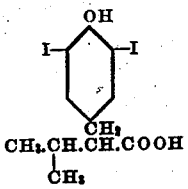

by using isovaleric anhydride

(4 moles), potassium or sodium isovalerate (1 mole) and 4 hydroxy benzaldehyde (1 mole) as starting materials. The initial condensation for preparation of the intermediate benzal is effected by heating the reaction mixture at a temperature of 130° to 140° for 8 hours.

EXAMPLE 33

Alpha-(4 hydroxy-3,5-diiodo benzyl) n. valeric acid having the formula shown in Example 6 by using n. valeric anhydride (4 moles), potassium valerate (1 mole) and 4 hydroxy benzaldehyde (1 mole) as the starting materials.

EXAMPLE 34

Alpha-(4 hydroxy-3,5-diiodo benzyl)-gamma methyl valeric acid having the formula

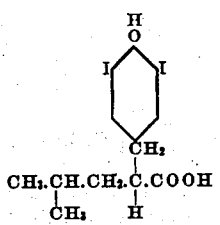

by using isocaproic anhydride

(4 moles), potassium isocaproate (1 mole) and 4 hydroxy benzaldehyde (1 mole) as the starting materials.

EXAMPLE 35

Alpha-(4 hydroxy-3,5-diiodo benzyl) caproic acid having the formula shown in Example 7, by using n. caproic anhydride (4 moles), potassium n. caproate (1 mole), and 4 hydroxy benzaldehyde as the starting materials.

EXAMPLE 36

Alpha-(4 hydroxy-3,5-diiodo benzyl) caprylic acid having the formula shown in Example 9, by using n. caprylic anhydride (4 moles), potassium n. caprylate (1 mole), and 4 hydroxy benzaldehyde as the starting materials.

EXAMPLE 37

Alpha (4 hydroxy-3,5-diiodo benzyl) cyclo pentyl acetic acid having the formula

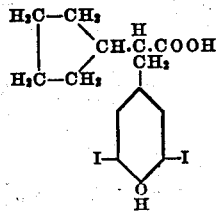

was prepared in accordance with the method described in Example 31 by using the anhydride of cyclopentyl acetic acid, the potassium salt thereof and 4 hydroxy benzaldehyde as the initial starting materials. The anhydride was prepared in accordance with the method described in Example 31 for the preparation of butyric anhydride.

EXAMPLE 38

Alpha (4 hydroxy-3,5-diiodo benzyl) cyclo hexyl acetic acid having the formula

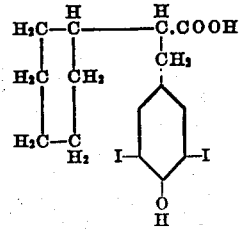

was prepared in accordance with the method described in Example 31 by using the anhydride of cyclo hexyl acetic acid, the potassium salt thereof, and 4 hydroxy benzaldehyde as the initial starting materials. The anhydride was prepared in accordance with the method described in Example 31 for the preparation of the butyric anhydride.

EXAMPLE 39

Alpha -(4 hydroxy - 3,5 - diiodo benzyl) caproic acid having the formula shown in Example 7 was also prepared as follows:

2 moles (224 grams) of methyl, n. amyl ketone is dissolved in 1 mole (136 grams) of anisaldehyde and dry hydrogen chloride bubbled in, keeping the temperature at approximately 20° C. When 45–50 grams of HCl are absorbed the solution is saturated. The solution is then stirred at room temperature in an autoclave (to retain the HCl) for 8 hours, after which it is poured into water, and the water separated from the oily layer. The oily layer is washed several times with water and finally with dilute sodium bicarbonate and then water. The washed oily layer is then vacuum distilled, recovering the excess methyl n. amyl ketone in the predistillate. The 4 methoxy benzal n. amyl methyl ketone is produced according to the following reaction:

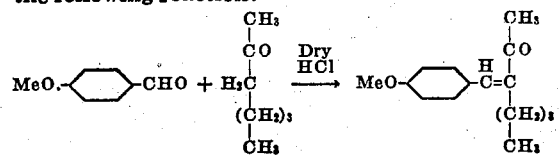

The foregoing benzal ketone is dissolved in twice its volume of 95% ethyl alcohol and reacted with a sodium hypochloride solution prepared as follows: 500 grams of NaOH is dissolved in 1100 c. c. of water and the solution cooled to 5° C. Then 240 grams of chlorine are bubbled in to form the hypochlorite. A sufficient quantity of the hypochlorite solution is added to the alcoholic solution of the 4 methoxy benzal n. amyl ketone so that 3 moles of chlorine are supplied for the oxidation of each mole of the ketone according to the following reaction:

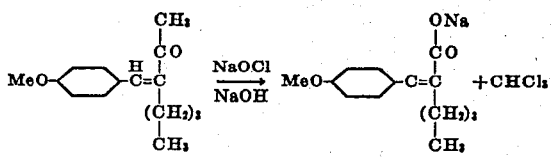

The mixture is allowed to heat up to 40° C. and the rate of addition of the hypochlorite solution adjusted to maintain that temperature. After all of the hypochlorite solution is added, stirring is continued until no more heat is generated. Most of the chloroform produced is evaporated by ventilating the surface of the reaction mixture. The mixture is added to 8 liters of water, filtered and acidified, which results in the precipitation of alpha 4 methoxy benzal caproic acid. It is filtered off and recrystallized from ligroin, after which it is reduced with sodium amalgam to the benzyl compound as described in Example 31. The alpha (4 methoxy benzyl) caproic acid is demethylated with hydrobromic acid and acetic acid as described in Example 1. It is then iodinated as described in Example 4.

EXAMPLE 40

Alpha-(4 hydroxy-3,5-benzyl) oenanthic acid having the formula shown in Example 9, was prepared in accordance with the method described in Example 39 by using n. hexyl methyl ketone as the initial starting material corresponding to the n. amyl methyl ketone of Example 39, followed by the steps as described in Example 39.

EXAMPLE 41

2-(4 hydroxy-3,5-diiodo benzyl) cyclo hexyl carboxylic acid having the formula

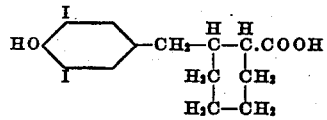

is prepared in accordance with the method described in Example 2 by using hexahydro phthalic anhydride and anisole as the initial starting materials and effecting the condensation thereof by aluminum chloride followed by reduction of the condensation product. These reactions are as follows:

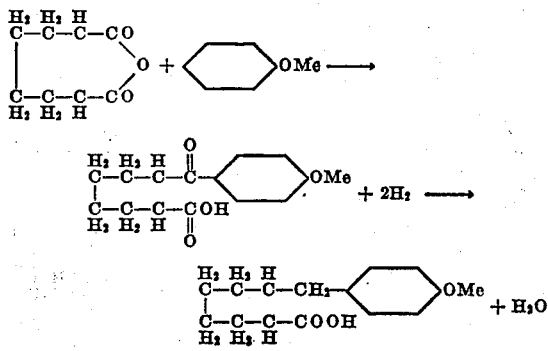

The reduction product is demethylated as described in Example 1 and iodinated as in Example 4.

EXAMPLE 42

2-(4 hydroxy-3,5-diiodo benzyl)-4,5-dimethyl cyclo hexyl carboxylic acid having the formula

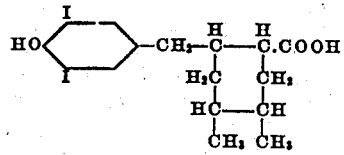

is prepared in accordance with the method described in Example 2 by using 4,5-dimethyl hexahydro phthalic anhydride and anisole as the initial starting materials. The condensation of the reactants and the subsequent reduction follow the course described in Example 41 to yield 2-(4 methoxy benzyl)-4,5-dimethyl cyclo hexyl carboxylic acid which is then demethylated as in Example 1 and iodinated as described in Example 4.

EXAMPLE 43

Zeta-(4 hydroxy-3,5-diiodo phenyl)-alpha, zeta dimethyl octanoic acid, having the formula

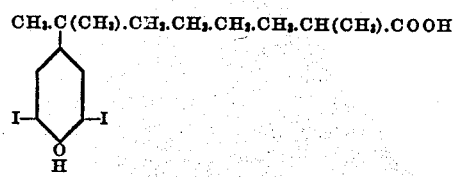

was prepared as follows:

The methyl ester of citronellic acid which is a mixture of $$CH_3.C(CH_3):CH(CH_2)_3.CH(CH_3).COOMe$$

and $CH_2:C(CH_3).(CH_2)_4.CH(CH_3)COOMe$ is reacted with anisole in accordance with the method described in Example 1. When the anisole and the mixture of the esters of the two isomeric citronellic acids are reacted the methoxy phenyl group enters the molecule at the zeta carbon atom of each citronellate, so that the reaction products are identical. The ester,

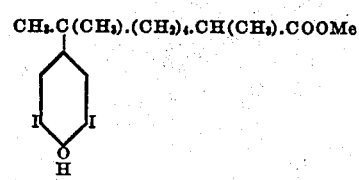

is then saponified and iodinated as described in Example 1.

The following compounds were prepared in accordance with the method described in Example 43.

EXAMPLE 44

Delta-(4 hydroxy-3,5-diiodo phenyl) n. valeric acid having the formula shown in Example 20 was prepared in accordance with the method of Example 43 by using the methyl ester of allyl acetic acid, $CH:CH.CH.CH.COOMe$ and anisol as the starting materials. The reaction produces delta (4 methoxy phenyl) valeric acid methyl ester which is then demethylated and iodinated as described in Example 1.

EXAMPLE 45

Delta (4 hydroxy-3,5-diiodo phenyl) caproic acid having the formula

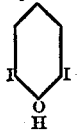
CH₂.CH₂.CH₂.CH₂.CH₂.COOH was prepared in accordance with the method of Example 43 by using the methyl ester of crotonyl acetic acid (CH₃.CH:CH.CH₂.CH₂.COOMe) and anisole as the starting materials for the initial condensation. The subsequent steps of demethylation and iodination are as described in Example 1.

EXAMPLE 46

Alpha methyl, 2(4 hydroxy-3,5-diiodo phenyl)-4 methyl cyclo hexyl acetic acid having the formula

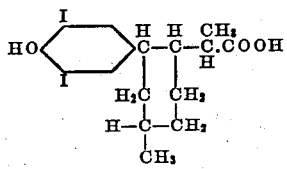

was prepared in accordance with the method of Example 43 by using, as initial starting materials, the ethyl ester of alpha methyl-(4 methyl cyclo hexene-Δ-1,2) acetic acid and anisole. The methyl ester is prepared as follows:

Dissolve 1 mole of 4 methyl cyclo hexanone in 1 liter of a mixture of equal parts of benzene and toluene. To this solution add 1 mole of alpha bromo propionic acid ethyl ester. Then add an excess of 1 mole of pure zinc dust and reflux the mixture for about 3 hours. 2 moles of hydrochloric acid (10% solution) is now added. The aqueous layer is discarded and the solvent layer containing the hydroxy ester is dried over sodium sulphate. Dry hydrogen chloride is bubbled into the dried solvent layer for 4 hours to dehydrate the hydroxy ester. The hydrochloric acid is washed out therefrom with water and the residue is fractionated, recovering, first, the solvent and then, the alpha (4 methyl cyclo hexene-Δ-1,2-)- propionic acid ethyl ester.

This product is then condensed with anisole, using aluminum chloride as in Example 1. The mixture is saponified as in Example 1 to yield alpha methyl, 2-(4 hydroxy phenyl) 4 methyl cyclo hexyl acetic acid which is iodinated as described in Example 1.

EXAMPLE 47

Alpha ethyl, 2(4 hydroxy-3,5-diiodo phenyl) cyclo hexane acetic acid having the formula

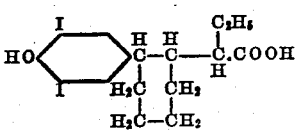

was prepared in accordance with the method described in Example 46 by using alpha ethyl cyclo hexene-Δ-1,2-acetic acid ethyl ester and anisole as the initial starting materials, followed by saponification and iodination.

EXAMPLE 48

2-(4 hydroxy-3,5-diiodo phenyl)-cyclo pentyl acetic acid having the formula

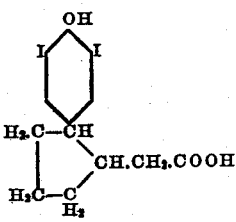

was prepared in accordance with the method described in Example 46 by using cyclo pentene-Δ-1,2-acetic acid methyl ester and anisole as the initial starting materials, followed by saponification and iodination.

This application is a continuation in part of our pending application, Serial No. 516,970, filed January 4, 1944.

We claim:
1. Compounds having the general formula

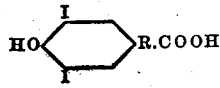

wherein R is a divalent saturated hydrocarbon aliphatic radical having from 4 to 10 carbon atoms.

2. Alpha-(4 hydroxy-3,5-diiodo benzyl)-n. butyric acid.
3. Alpha-(4 hydroxy-3,5-diiodo benzyl)-n. valeric acid.
4. Omega-(4 hydroxy-3,5-diiodo phenyl)-n. undecanoic acid.

SAMUEL NATELSON.
BENJAMIN KRAMER.
RALPH TEKEL.